July 28, 1959 — H. N. IPSEN — 2,896,775
TRANSFER MECHANISM
Filed June 26, 1957 — 5 Sheets-Sheet 1

INVENTOR
Harold N. Ipsen
by Carlson, Pitzner,
Hubbard & Wolfe
ATTORNEYS

July 28, 1959

H. N. IPSEN 2,896,775

TRANSFER MECHANISM

Filed June 26, 1957

INVENTOR
Harold N. Ipsen
by Carlson, Pitzner, Nathan & Wolfe
ATTORNEYS

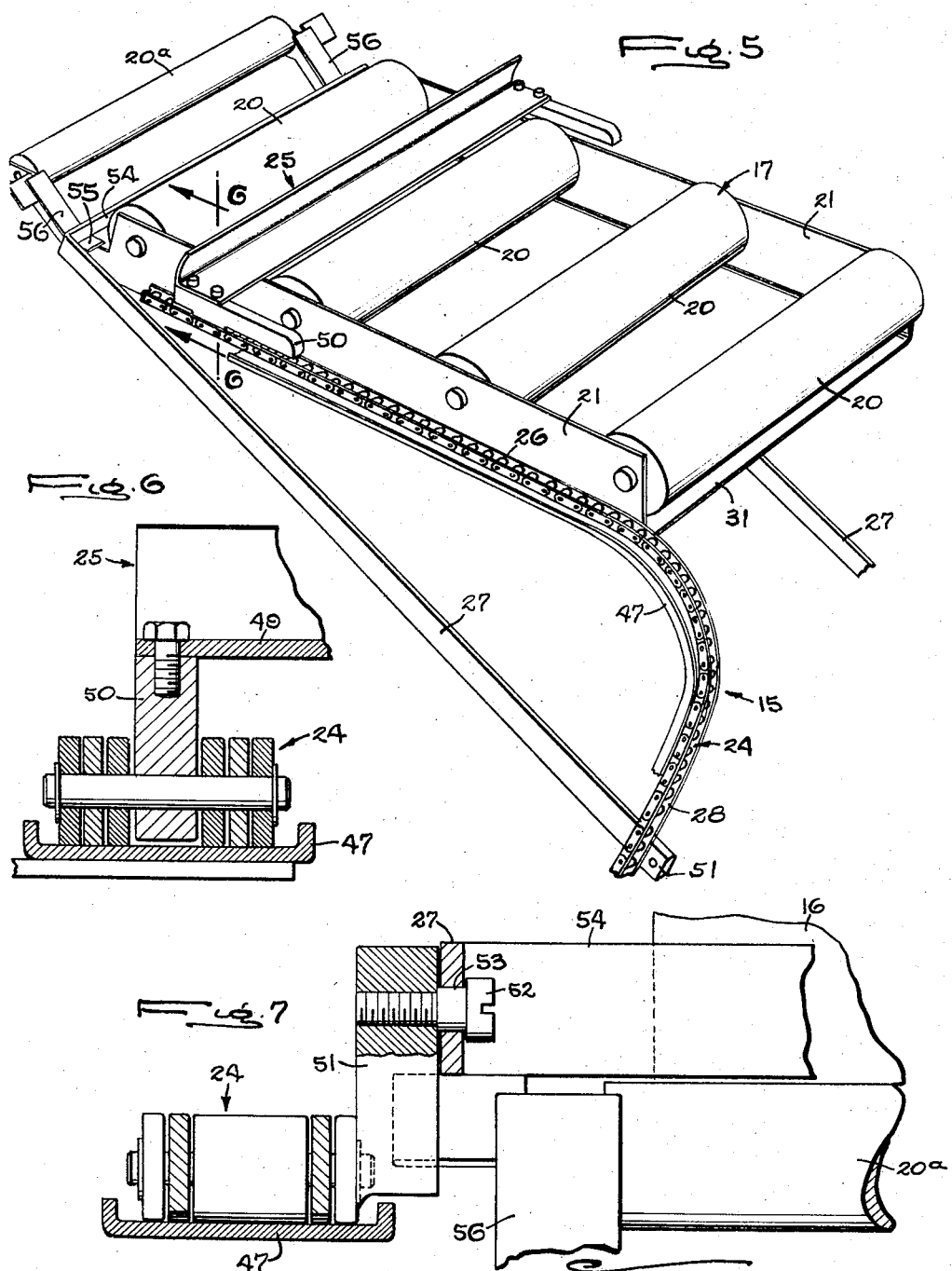

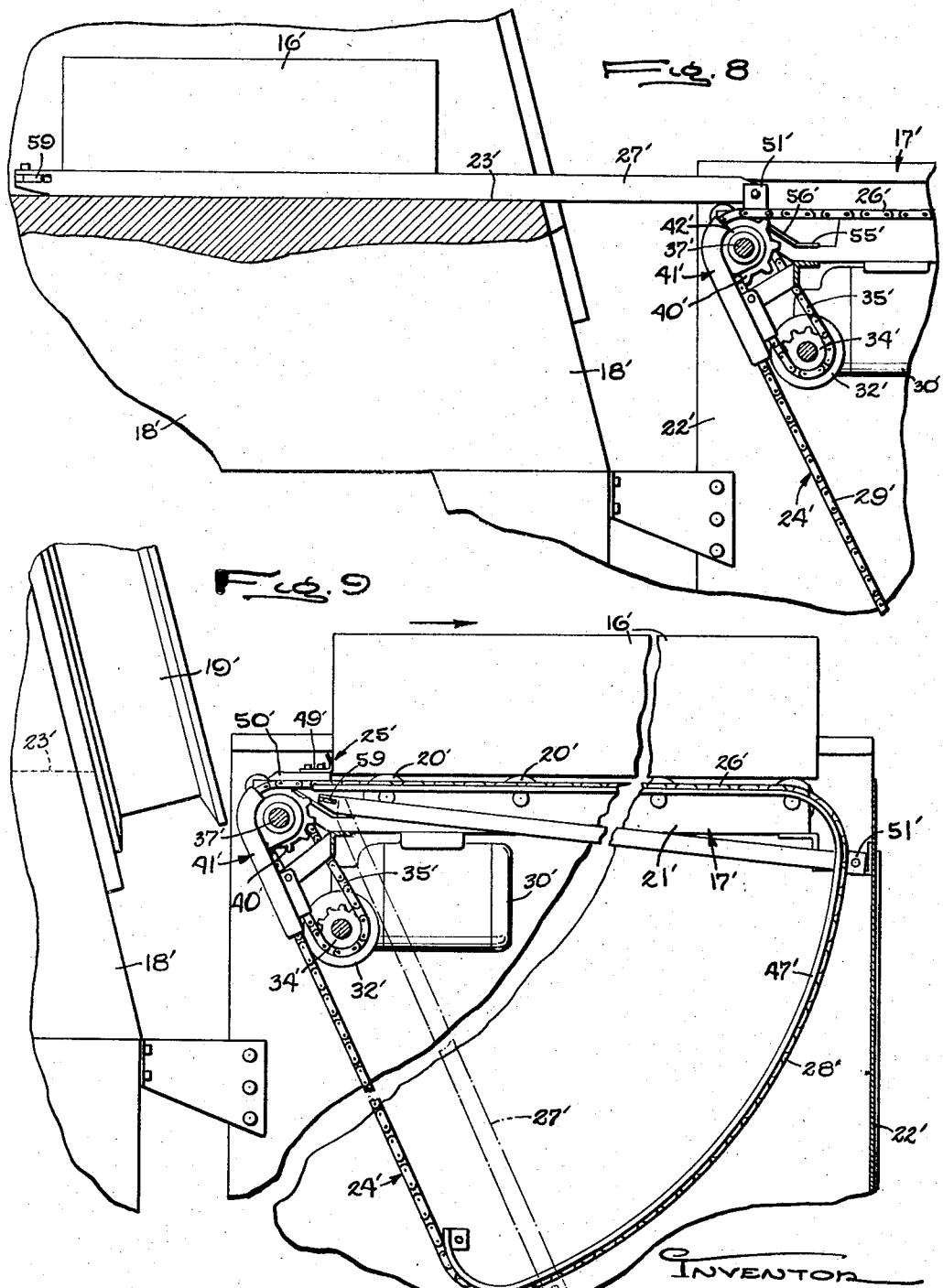

July 28, 1959 H. N. IPSEN 2,896,775
TRANSFER MECHANISM
Filed June 26, 1957 5 Sheets-Sheet 5
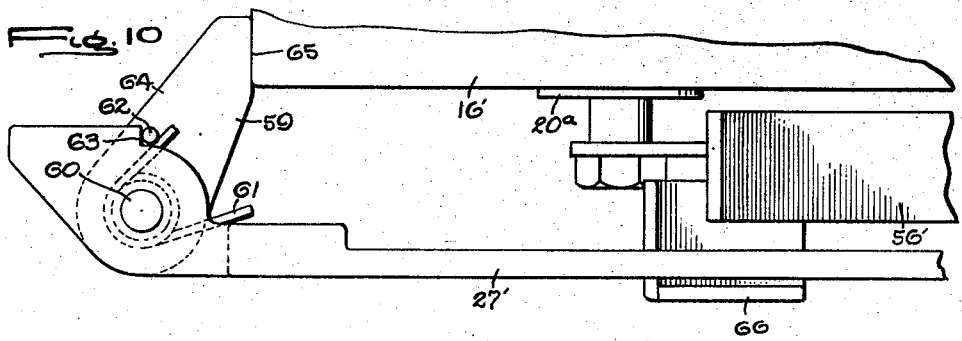
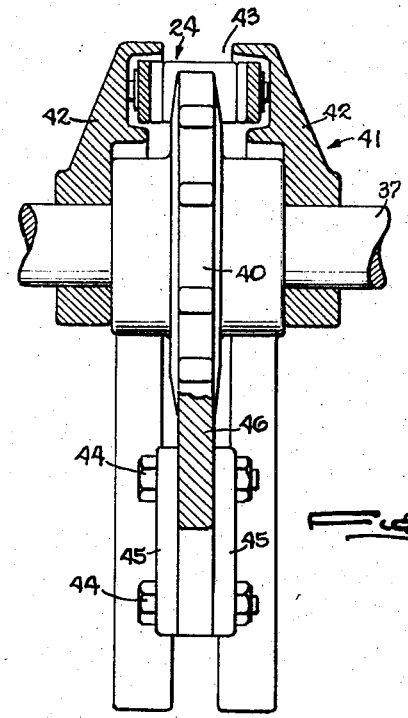
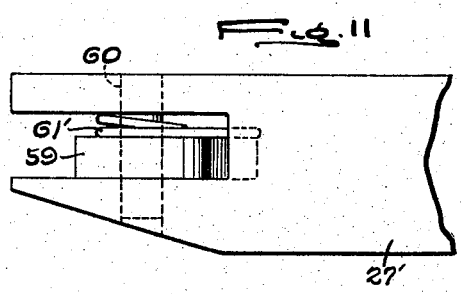
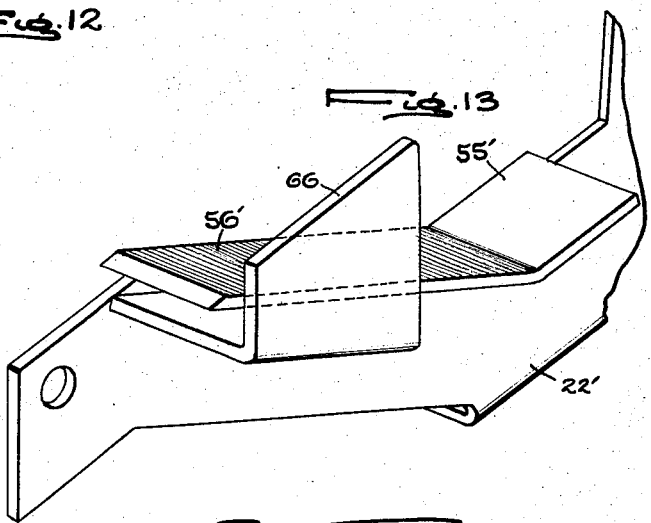
INVENTOR
Harold N. Ipsen
by Carlson, Pitzner, Hubbard & Wolfe
ATTORNEYS

United States Patent Office 2,896,775
Patented July 28, 1959

2,896,775

TRANSFER MECHANISM

Harold N. Ipsen, Rockford, Ill.

Application June 26, 1957, Serial No. 668,250

7 Claims. (Cl. 198—221)

This invention relates to mechanism for moving articles such as workpieces along a rectilinear path and, more particularly, to a mechanism which slides the work horizontally from one position to another.

The general object of the invention is to provide a new and improved transfer mechanism which is capable of moving the work through a comparatively long distance but which at the same time is relatively compact.

A more detailed object is to utilize an endless chain with an abutment for engaging the work and moving the latter through a part of the distance and to employ an elongated bar which is associated with the chain in a novel manner so that it may be projected beyond the chain to move the work through the remainder of the distance.

The invention also resides in the manner of connecting the bar to the chain so that the bar is wholly within the confines of the chain while the abutment is active and thereby minimizes the over-all size of the transfer mechanism.

Other objects and advantages of the invention will become apparent from the following detailed description taken in connection with the accompanying drawings, in which—

Fig. 5 is a fragmentary perspective view of the transfer mechanism.

Fig. 6 is an enlarged fragmentary sectional view taken along the line 6—6 in Fig. 5.

Fig. 7 is an enlarged fragmentary end view of the transfer mechanism, parts being broken away and shown in section.

Fig. 8 is a fragmentary side elevation of a modification of the invention, parts being broken away and shown in section.

Fig. 9 is a view similar to Fig. 8 but shows the parts in a different position.

Fig. 10 is a fragmentary plan view of the bar used in the modified form.

Fig. 11 is a side view of the end portion of the bar.

Fig. 12 is an enlarged sectional view taken along the line 12—12 in Fig. 1.

Fig. 13 is a fragmentary perspective view of a guide used in the modified form of the invention.

Figure 1:
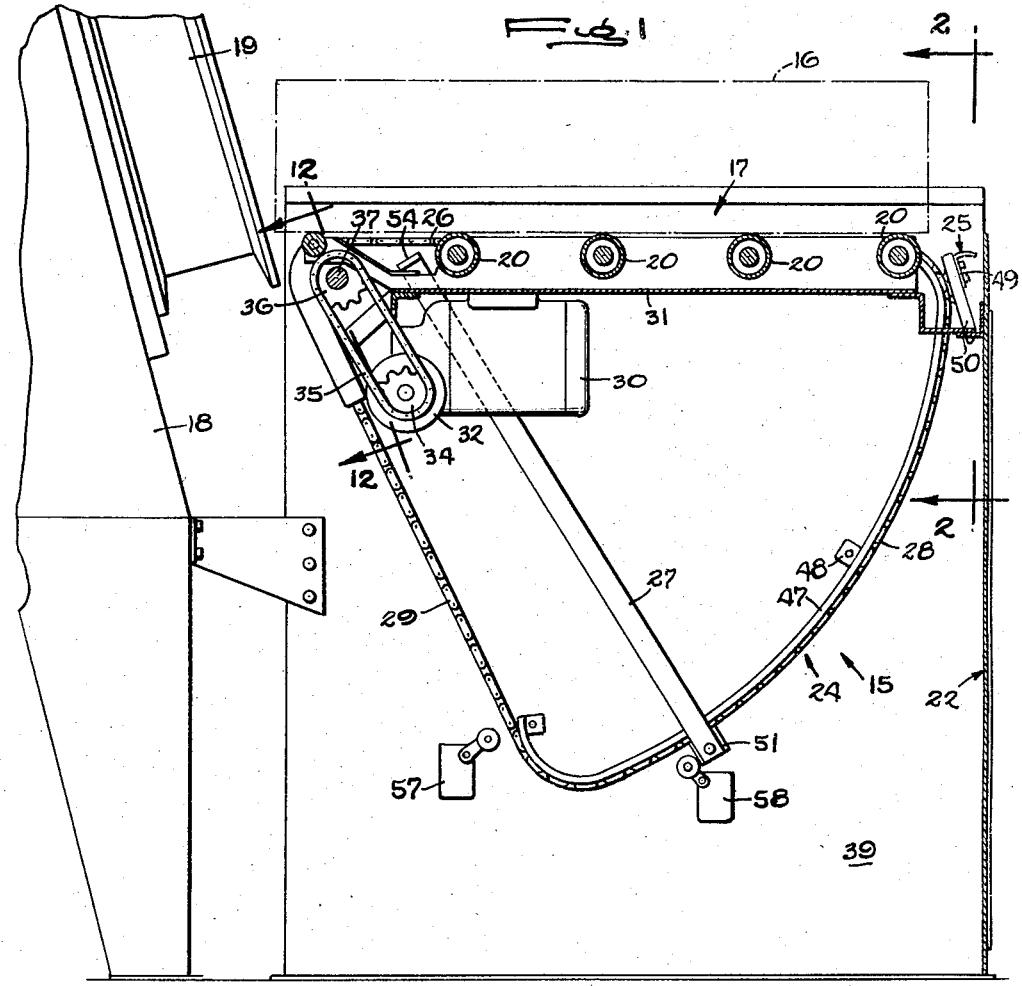
Figure 1 is a fragmentary side elevation of a heat treating furnace utilizing the novel transfer mechanism of the present invention to load the work into the furnace, parts being broken away and shown in section.
Figure 2:
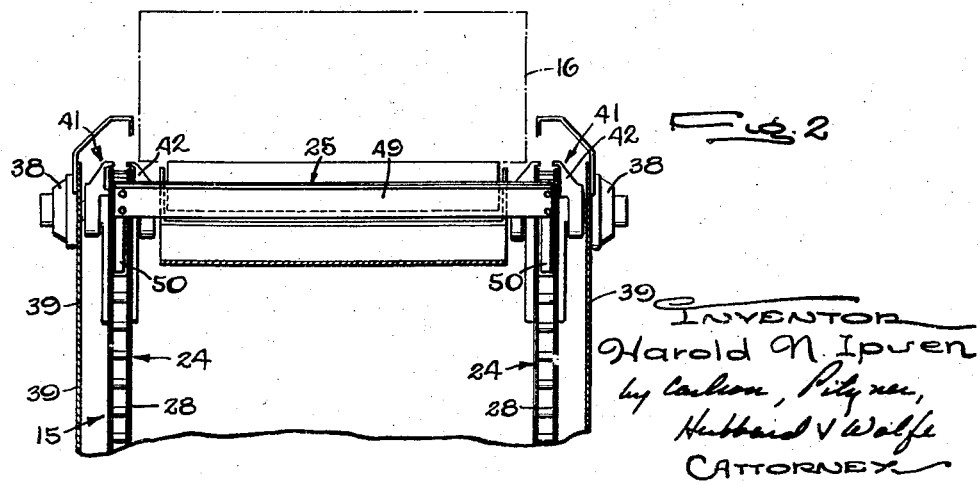
Fig. 2 is a fragmentary sectional view taken along the line 2—2 in Fig. 1.

As shown in the drawings for purposes of illustration, the invention is embodied in a power operated mechanism 15 for advancing workpieces along a rectilinear path. For example, the workpieces may be carried in a basket or tray 16 which is placed on a loading platform 17 and slid endwise from the platform into a heat treating furnace 18 through an opening controlled by a door 19. Herein, the platform 17 is formed by a series of parallel horizontal rollers 20 journaled in spaced bars 21 (Fig. 5) which are a part of a rigid framework 22 resting on the floor next to the furnace. The rollers are at the level of the furnace hearth 23 (Fig. 3) so that the tray 16 may be advanced directly from one to the other.

According to the present invention, the transfer mechanism 15 is constructed and arranged in a novel manner so as to provide a comparatively long range of movement of the workpieces while the mechanism itself is contained within a relatively small space and does not add materially to the over-all size of the apparatus with which it is associated. Thus, in the illustrated form of the invention, the transfer mechanism is located entirely within the confines of the platform 17 and the supporting framework 22 and yet it is capable of advancing the work through a distance approximately equal to twice the length of the platform.

To achieve the foregoing ends, the transfer mechanism 15 comprises a chain 24 carrying an abutment 25 which engages the work and advances the latter as the abutment moves along a horizontal run 26 (Figs. 3 and 5) of the chain. When the abutment reaches the end of the run, it passes out of engagement with the work. At this time, an elongated bar 27, which has one end pivotally connected to the chain behind the abutment lies along the run 26 behind the work. Continued advance of the chain moves the free end of the bar into engagement with the work and then projects the bar horizontally beyond the end of the run so that the bar continues the advance of the work. Prior to the time the bar engages the work, however, it is disposed generally within the space occupied by the chain.

In the present instance, two endless chains 24 are used with one disposed at each side of the platform 17 in a vertical plane. The run 26 of each chain is slightly below the centers of the rollers 20 and extends from one end of the platform to the other. At the outer end of the platform, the run 26 connects with a downwardly extending arcuate run 28 whose center *a* is located near the opposite end of the run 26. The chain is completed by a run 29 connecting the ends of the runs 26 and 28.

The chains 24 are driven by a reversible motor 30 mounted on the underside of a horizontal cross plate 31 of the framework 22 through a speed reducer 32, a sprocket wheel 34 on the output of the reducer, a chain 35 and a sprocket wheel 36 which is fast on a horizontal shaft 37 journaled in bearings 38 on the side plates 39 of the framework. The chains 24 extend around sprocket wheels 40 also keyed to the shaft 37 to complete the drive. A guide 41 (see Fig. 12) in the form of two laterally spaced castings 42 routed out to form a channel 43 keeps the chain from leaving the sprocket wheel 40. The castings are mounted freely on the shaft 37 on opposite sides of the sprocket wheel and are clamped together by bolts 44 passing through flanges 45 on the castings. A plate 46 held between the flanges is welded to the cross plate 31 and prevents the guide 41 from turning. A second guide 47 extends along the runs 26 and 28 to define the latter and is mounted on the adjacent side plate 39 by means of brackets 48. Similar guides are provided for each chain.

Herein, the abutment 25 is a curved flange upstanding from a bar 49 (Figs. 5 and 6) which spans the chains 24. The ends of the bar are secured to blocks 50 which, in turn, are connected alined links of the chains and which space the bar from the chains so that the bar passes over the rollers 20 as it moves along the run 26.

With two chains, two transfer bars 27 are employed, one at each side of the platform 17 inside the adjacent chain. The bars are approximately as long as the platform 17 and one end of each is pivotally connected to the adjacent chain. As shown in Fig. 7, the connection between each chain and the associated bar comprises a block 51 welded to the inside of one link of the chain and a shouldered screw 52 which passes through the bar and is threaded into the block. Thus, the shank 53 of the screw constitutes the pivot for the bar. The spacing of the blocks 50 and the blocks 51 along the chain is slightly greater than the length of the platform 17 so that the pusher flange 25 passes over the point $a$ before the pivoted ends of the bars 27 reach the run 26.

The free ends of the transfer bars 27 are joined by a narrow horizontal plate 54 which constitutes an abutment for engaging the work tray 16. When the pivoted ends of the bars are on the arcuate run 28, the plate 54 is between the end two rollers 20 and 20$^a$ as shown in Figs. 1 and 5 so that the tray and the pusher plate 49 may pass over it as the latter moves along the horizontal run 26. When in this position, the plate 54 rests on sheet metal strips 55 which are secured to the framework 22. The strips include cam portions 56 inclined upwardly toward the furnace 18 so that, after the blocks 51 reach the run 26 and the bars 27 begin to be moved forwardly by the chains 24, the plate 54 rides up the cam portions and onto the top of the end roller 20$^a$ in position to engage a tray 16.

With the arrangement described above, the transfer mechanism 15 may be used to slide the tray 16 of workpieces into the furnace 18. For this purpose, the transfer mechanism initially is in the condition shown in Fig. 1, that is, the pusher bar 49 is at the junction of the horizontal and arcuate runs 26 and 28, the pivoted ends of the transfer bars 27 are near the bottom of the arcuate run, and the cross plate 54 joining the free ends of these bars is resting on the strips 55. A tray 16 then is placed on the platform 17 and the motor 30 is energized to move the chains 24 in the advancing direction, viz., counterclockwise in Fig. 1.

Figure 3:
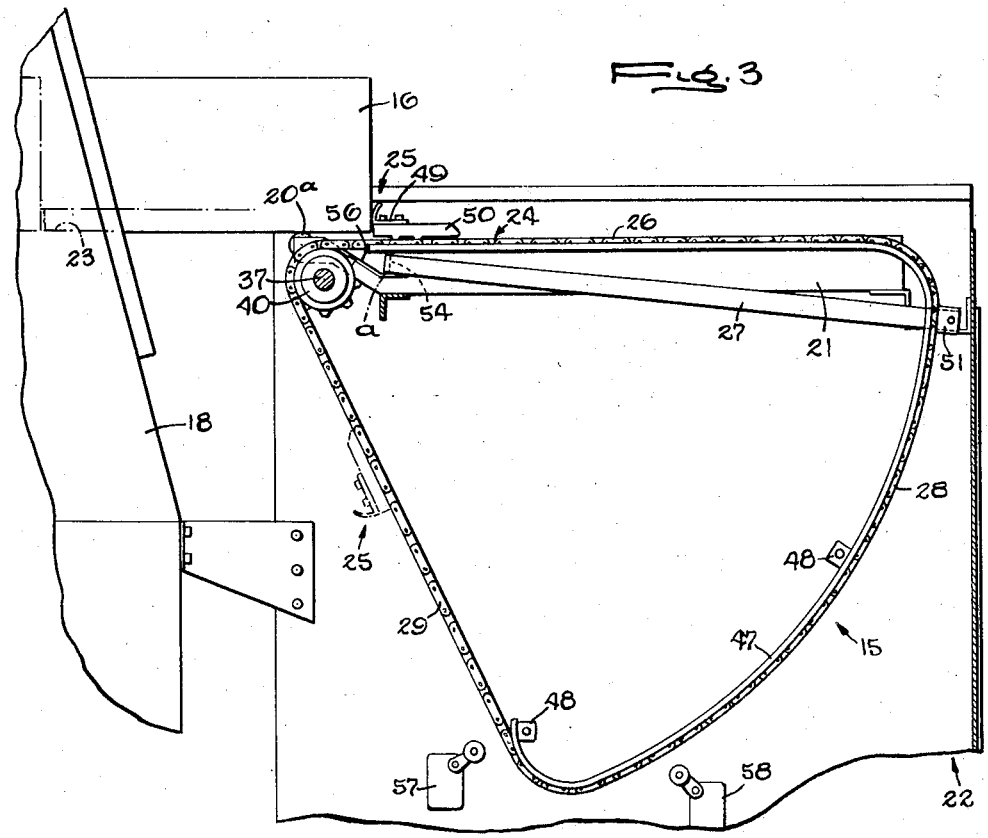
Fig. 3 is a view similar to Fig. 1 but shows the parts in a different position.
Figure 4:
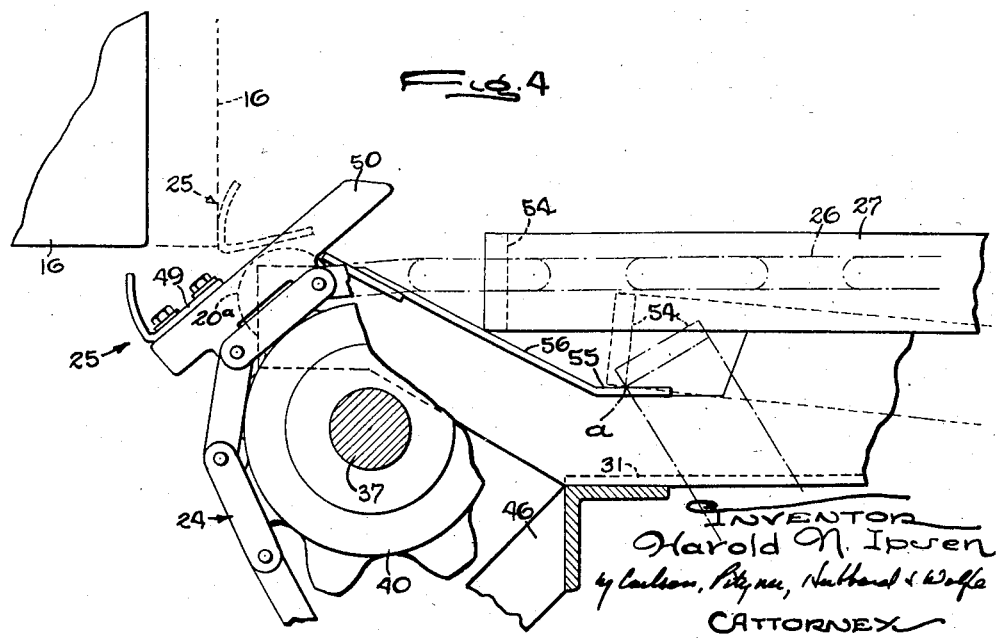
Fig. 4 is an enlarged fragmentary view of a part of the transfer mechanism.

As the chains 24 begin to advance, the pusher bar 49 moves into the horizontal run 26 and the flange 25 engages the end of the tray 16. Upon continued advance of the chains, the flange slides the tray forward. At the same time, the blocks 51 which connect the transfer bars 27 to the chains move up along the arcuate run 28 as shown in Fig. 3. When the pusher bar 49 reaches the end of the horizontal run 26, the tray 16 has been advanced a distance about equal to the length of this run and is resting on the furnace hearth 23. The pusher bar 49, as it passes out of the horizontal run from the broken line position to the full line position in Fig. 4, moves the tray past the end roller 20$^a$ of the platform and beyond the free ends of the transfer bars 27. The latter, which started in the position shown in dot-dash lines, also move from the broken line position to the one shown in full lines. In other words, the bars 27 become generally parallel to the horizontal run and then begin to move forward since the blocks 51 have entered this run.

The cross plate 54 rides up the cam portion 56 of the strips 55 as the transfer bars 27 move forward and this raises the bars up on top of the rollers 20. As the chains continue to advance, the plate engages the trailing end of the tray 16. The bars 27 move horizontally into the furnace 18 as shown in broken lines in Fig. 3 and push the tray completely into the furnace. When the pivoted ends of the transfer bars are moving along the horizontal run 26, the pusher bar 49 travels along the run 29 and, when these ends of the transfer bars near the end of the run 26, the flange 25 on the pusher bar actuates a limit switch 57 which is disposed alongside the run 29 and which reverses the motor 30 through a suitable control circuit (not shown).

When the motor 30 is reversed, the chains 24 move in the opposite direction so that the transfer bars 27 are retracted and the pusher bar 49 moves up along the run 29. The cross plate 54 drops back down onto the strips 55 and the pivoted ends of the bars 27 travel down along the arcuate run 28 until one of the blocks 51 actuates a switch 58 located alongside this run (see Fig. 1). At this time, the pusher bar has returned to its original position as have all the other parts and the switch 58 deenergizes the motor.

Instead of pushing the work, the invention may be utilized for pulling the work such as out of the furnace 18' and onto the platform 17'. Such an arrangement is shown in Figs. 8 through 11 and 13 in which the parts corresponding to parts of the preferred embodiment are identified by like but primed reference characters. In this form, the construction and arrangement of the chains 24' as well as the drive from the motor 30' is the same as in the preferred form. Also, blocks 51' pivotally connect the ends of the transfer bars 27' to the chains and the free ends of the bars drop down onto the cam strips 56' when the blocks are on the arcuate run 28'. The cross plate 54, however, is replaced by fingers 59 which yield to pass the tray 16' as the bars are projected into the furnace 18' and then snap in behind the tray to pull the latter on the return stroke.

As shown in Figs. 10 and 11, each finger or pawl 59 may have one end disposed in the bifurcated free end of the corresponding transfer bar 27' and pivotally connected there to the bar by a pin 60. A torsion spring 61 coiled around the pin acts between the arm and a stud 62 rigid with the pawl 59 and urges the latter to the projected position in which the stud engages a shoulder 63 on the bar as shown in Fig. 10. On the forward stroke of the bars 27', surfaces 64 on the leading edges of the pawls 59 engage the tray 16' which cams the pawls in against the action of the springs 61 to permit the pawls to pass along the sides of the tray. When the pawls clear the tray, they are snapped out to the projected position by the springs so that abutment surfaces 65 on the pawls engage the tray on the return stroke of the bars 27'. Guide plates 66 (Fig. 13) welded to the framework 22' are disposed along the outsides of the transfer bars and prevent the latter from bowing out during both the forward and return strokes.

The pusher bar 49' is mounted on the chains 24' by the same means, that is, the blocks 50', as in the preferred form and is spaced in front of the pivoted ends of the transfer bars 27' about the same distance. In this case, however, the flange 25' is on the opposite edge of the pusher bar since the latter advances the tray 16' in the opposite direction.

In using the modified form of the invention, to remove a tray 16' from the furnace 18', the chains 24' are turned counterclockwise as viewed in Figs. 8 and 9 to project the bars 27' beyond the chains, this being accomplished in the same manner as with the preferred form. As the bars move forward, the surfaces 64 of the pawls 59 engage the tray which swings the pawls into pass the tray. Near the end of the forward stroke, the pawls pass clear of the tray and are snapped out to the projected position by the springs 61. At that time, the motor 30' is reversed as by a switch (not shown) actuated by the pusher bar 49'.

When the motor 30' reverses the direction of chain movement, the pawls 59 engage the far end of the tray 16' so that the bars 27' pull the tray out of the furnace 18' and onto the platform 17'. As the blocks 51' leave the horizontal run 26' and start on the arcuate run 28', the pawls 59 drop down between the two end rollers 20' onto the strips 55'. The pusher bar 49' then enters the horizontal run 26' at the end near the furnace and engages the tray as shown in Fig. 9. The pusher bar continues the advance of the tray and may move the tray onto another support (not shown) adjacent the platform 17'. The cycle may be terminated by stopping the motor 30' through a switch (not shown) actuated by one of the blocks 51'.

I claim as my invention:

1. Transfer mechanism comprising an elongated platform composed of a plurality of parallel horizontal rollers extending transversely of the platform and laterally spaced apart, two parallel endless chains, one disposed on each side of said platform and each having a horizontal run extending along the platform and an arcuate run extending downwardly from the horizontal run adjacent one end of the platform, the center of said arcuate run being disposed adjacent the other end of the platform and beneath the upper sides of said rollers, two parallel elongated bars, one disposed on each side of said platform and each having one end pivotally connected to the arcuate run of the adjacent chain, stationary support means located adjacent the centers of said chains between two of said rollers, abutment means on the free ends of said bars and resting on said support means, a reversible power actuator for advancing said chains to move the pivoted ends of said bars up along the arcuate run and then along said horizontal run thereby to move said bars endwise and project the same beyond said platform, a cam operable during such endwise movement of said bars to guide the bar ends up onto the tops of said rollers, means for reversing said actuator to retract said bars, said abutment means being operable during movement of the bars in one direction to engage a workpiece and move the same along a path beyond the end of said platform, and an elongated member spanning and connected to said chains in advance of the pivoted ends of said bars to move the workpiece along said platform.

2. Transfer mechanism comprising means defining a horizontal path at a predetermined level, an endless chain having a horizontal run extending along a portion of said path and an arcuate run connected to one end of the horizontal run, the center of said arcuate run being spaced beneath said level and disposed adjacent the opposite end of said horizontal run, an elongated transfer bar, a connection pivotally joining one end of said bar to said chain along said arcuate run, a support disposed adjacent said center, an abutment mounted on the free end of said bar and resting on said support, a reversible power actuator operable to drive said chain forward and back thereby to advance said connection along said arcuate run and then along said horizontal run upon forward movement of the chain and to retract the connection upon backward movement, a stationary cam operable to guide the free end of said bar up to said level as said connection moves forward along said horizontal run, said bar moving back and forth along said path beyond said horizontal run as said connection moves back and forth along the horizontal run and said abutment being operable to engage and move a workpiece during movement of the bar in one direction, and a second abutment connected to said chain in advance of said connection and operable to move the workpiece along the portion of said path adjacent the horizontal run as said connection moves along said arcuate run.

3. In a mechanism for moving a workpiece along a predetermined path, the combination of, an endless chain having a generally straight run extending along a portion of said path, an elongated bar having one end pivotally connected to said chain to turn relative to the latter about an axis extending transversely of said path, a reversible power actuator for advancing said chain, means for guiding said bar for movement along said path and beyond the end of said run as the pivoted end of the bar is advanced along the run, an abutment mounted on the free end of said bar and operable as the chain is advanced in one direction to engage and move the workpiece along the portion of said path beyond said run, and a second abutment mounted on said chain and spaced from the pivoted end of said bar to engage and advance a workpiece along said run when it is within the confines of said chain.

4. Transfer mechanism comprising an elongated platform composed of a plurality of parallel horizontal rollers extending transversely of the platform and laterally spaced apart, two parallel endless chains, one disposed on each side of said platform and each having a horizontal run extending along the platform and an arcuate run extending downwardly from the horizontal run adjacent one end of the platform, the center of said arcuate run being disposed adjacent the other end of the platform and beneath the upper sides of said rollers, two parallel elongated bars, one disposed on each side of said platform and each having one end pivotally connected to the arcuate run of the adjacent chain, stationary support means located adjacent the centers of said chains between two of said rollers, abutment means on the free ends of said bars and resting on said support means, a reversible power actuator for advancing said chains to move the pivoted ends of said bars up along the arcuate run then along said horizontal run thereby to move said bars endwise and project the same beyond said platform, a cam operable during such endwise movement of said bars to guide the bar ends up onto the tops of said rollers, and means for reversing said actuator to retract said bars, said abutment means being operable during movement of the bars in one direction to engage a workpiece and move the same along a path beyond the end of said platform.

5. Transfer mechanism comprising means defining a horizontal path at a predetermined level, an endless chain having a horizontal run extending along a portion of said path and an arcuate run connected to one end of the horizontal run, the center of said arcuate run being spaced beneath said level and disposed adjacent the opposite end of said horizontal run, an elongated transfer bar, a connection pivotally joining one end of said bar to said chain along said arcuate run, a support disposed adjacent said center, an abutment mounted on the free end of said bar and resting on said support, a reversible power actuator operable to drive said chain forward and back thereby to advance said connection along said arcuate run and then along said horizontal run upon forward movement of the chain and to retract the connection upon backward movement, and a stationary cam operable to guide the free end of said bar up to said level as said connection moves forward along said horizontal run, said bar moving back and forth along said path beyond said horizontal run as said connection moves back and forth along the horizontal run and said abutment being operable to engage and move a workpiece during movement of the bar in one direction.

6. Mechanism for transferring a workpiece along a predetermined path comprising a chain having a generally straight run disposed along said path and an arcuate run, said arcuate run connecting with said straight run at one end thereof and having its center disposed adjacent the other end of the straight run, a support disposed adjacent said center, an elongated bar having an inactive position in which one end is resting on said support and the other end is pivotally connected to said arcuate run, an actuator for driving said chain to advance the connected end of said bar toward said straight run and dispose the bar in an active position in which it parallels the straight run, means for guiding said bar for endwise movement along said path upon the continued advance of said chain whereby the free end of said bar may engage and advance the workpiece, and an abutment mounted on said chain in advance of the connected end of said bar and operable upon advance of the chain to engage the workpiece and move the latter forward of said support and in front of the free end of the bar.

7. Mechanism for transferring a workpiece along a predetermined path comprising a chain having a generally straight run disposed along said path and an arcuate run, said arcuate run connecting with said straight run at one end thereof and having its center disposed adjacent the other end of the straight run, a support disposed adjacent said center, an elongated bar having an inactive position in which one end is resting on said support and the other end is pivotally connected to said arcuate run, a reversible power actuator for driving said chain to advance the connected end of said bar toward said straight run and dispose the bar in an active position in which it parallels the straight run, means for guiding said bar for endwise movement along said path upon the continued advance of said chain thereby to project the free end of the bar beyond said straight run, means for reversing said actuator to retract said bar toward the inactive position, and a yieldable abutment mounted on the free end of said bar and operable to yield upon the forward stroke of the bar and pass free of a workpiece disposed along said path, said abutment engaging and advancing the workpiece as the bar is retracted.

References Cited in the file of this patent

UNITED STATES PATENTS

| | | |
|---|---|---|
| 727,790 | Hebb | May 12, 1903 |
| 1,769,201 | Brandeen et al. | July 1, 1930 |